Patented Nov. 10, 1942

2,301,875

UNITED STATES PATENT OFFICE 2,301,875

METHOD OF TREATING OIL WELLS

Harrison H. Holmes, Woodbury, N. J., assignor to E. I. du Pont de Nemours & Company, Wilmington, Del., a corporation of Delaware No Drawing. Application January 25, 1940, Serial No. 315,528

14 Claims. (Cl. 252—8.55)

This invention relates to an improved method of treating wells, for example, oil wells, in order to promote the flow of oil therefrom.

Where oil deposits are situated in calcareous formations, it is known to treat the well with a solution of an acid capable of reacting with said formation. Thus, solutions of hydrochloric acid of various strengths have been applied with general success to such wells. However, in cases where the oil is located in certain types of lime strata, such as dolomite, for example, the acid treatments employed heretofore have not proved efficacious. Instead of increasing the flow of oil, said treatments of a dolomite well generally leave its production rate unchanged, and often actually cause a decrease in the flow of oil.

The exact reason for the failure of the conventional acid treatments is not known. Analyses of the returned acids indicate that there has been reaction, since said acid contains a reasonable amount of the constituents of the dolomite strata. Many attempts to overcome this serious limitation in the use of acids have been made but none has proved entirely satisfactory. Perhaps the one most closely approaching a successful operation involves removing the acid from the formation when it is only partially spent. This procedure has in some cases promoted the flow of oil but it is apparent that the attendant waste and inefficiency renders it very disadvantageous.

The object of the present invention is a novel method for acidizing wells in order to promote the flow of oil therefrom. Another object is a method of acidizing which is operative when applied to wells drilled in any formation which is predominantly calcareous. A further object is a method of acidizing oil wells, which method permits enhanced penetration of the acid solution into the pores and crevices within the well. A still further object is a method of treating wells with acid solutions which prevents the formation of large quantities of solid material which tend to clog the fissures within the well. Other objects will become apparent as the invention is disclosed more fully hereinafter.

I have found that the foregoing objects are attained by employing as acidizing medium for oil wells, an aqueous buffer solution composed of a weak acid capable of reacting with calcareous rock formations and a salt which upon hydrolysis yields an alkaline reaction. By the term "weak acid" is meant an acid having a low dissociation constant rather than a low concentration of acid and this term is employed in this sense throughout the description of the invention. In addition to being capable of reacting with the calcareous rock, the weak acid must be such that the products of reaction with calcium carbonate and magnesium carbonate are at least for the major part, soluble in water. As is known, a buffer solution is capable of dissolving considerable amounts of either acid or alkaline materials while suffering only a slight change in its hydrogen ion concentration. This characteristic permits facile control of the hydrogen ion concentration within a desired range while at the same time retaining a high dissolving power with respect to the calcareous rock. Consequently, a weak acid may be used satisfactorily, provided said acid is sufficiently strong and present in sufficient concentration to dissolve a substantial quantity of the particular rock formation with which it is in contact.

Surprisingly, the buffer solutions when used in wells of the dolomite type as well as in other calcareous formations, may be permitted to remain in contact with the oil-bearing strata until reaction is complete, and when withdrawn are singularly free from insoluble solids. Nor is there any indication that precipitates which tend to clog the pores and crevices within the well have been formed. As stated hereinbefore, the exact reason for the difficulties arising when there is used the conventional acid, such as hydrochloric acid for example, is not known. However, it is believed that in those cases, the hydrochloric acid reacts with various constituents of the calcareous formation which are present in quantities which are rather small but yet sufficient to cause clogging of the pores and crevices within the well. Thus, iron compounds are present in dolomite rock, said iron being in a form which might be dissolved readily by an acid solution of high hydrogen ion concentration. Then, as the acidity of the solution decreases in view of its reaction with materials of an alkaline nature such as calcium carbonate, the dissolved iron compounds may precipitate out of the solution in a bulky, flocculent condition which potentially is an effective clogging material. When operating with the present buffer solutions which are acidic in nature, but which are characterized by a low hydrogen ion concentration, the undesirable constituents such as iron probably are never dissolved so that the spent solution does not include the flocculent precipitate and hence there is no clogging of the pores of the oil-bearing strata with the attendant prevention or diminution of the flow of oil. This explanation is advanced merely as theory which cannot be proved conclusively, so I do not intend to be bound thereby.

It will be understood that variations in the composition of the rock strata render it desirable to formulate buffer solutions adapted to the particular rock being treated. I prefer, however, to employ an acid having a dissociation constant not greater than $2.5 \times 10^{-1}$, because the use of acid solutions below this limit permits the preparation of buffer solutions whose hydrogen ion concentration can be controlled readily while maintaining a high dissolving power so that after treatment of the well, the spent solution will be substantially free from insoluble solids when the buffer solutions are used in conjunction with the dolomite wells normally encountered. If the dissociation constant of the acid employed be exceedingly high, as in the case of hydrochloric acid, the control of the hydrogen ion concentration is impracticable so that this desirable combination of high dissolving power and controlled hydrogen ion concentration cannot be attained. However, since variations in composition exist among the different rock strata in which wells are situated, it follows that no absolute limit can be fixed with respect to the dissociation constant of the acid above which my buffer solutions will not be satisfactory. Some of the acids which are adapted for use, together with their dissociation constants, are listed in the following table:

*Table I*

| Acid | Dissociation constant |
|---|---|
| Acetic | $1.86 \times 10^{-5}$ |
| Chloracetic | $1.55 \times 10^{-3}$ |
| Trichloracetic | $2 \times 10^{-1}$ |
| Propionic | $1.4 \times 10^{-5}$ |
| Butyric | $1.48 \times 10^{-5}$ |
| Formic | $2.14 \times 10^{-4}$ |
| Lactic | $1.38 \times 10^{-4}$ |
| Maleic | $1.5 \times 10^{-2}$ |
| Salicylic | $1.06 \times 10^{-3}$ |

The foregoing tabulation is not all-inclusive, but merely serves to indicate the acids contemplated as operative as ingredients of the buffer solutions.

Although any salt, which upon hydrolysis yields an alkaline reaction, can be employed in conjunction with my acid-treating solutions, alkali metal salts such as those of sodium and potassium are preferred. Thus, the acetates, formates, benzoates, butyrates, lactates, salicylates, as well as other salts of sodium and potassium, are very effective.

It will be understood that the buffer solutions must be sufficiently acidic to react suitably with the rock formation. Moreover, there must be enough water present to maintain at least the major portion of the soluble constituents in solution.

The following table sets forth buffer solutions which have been found satisfactory for acidizing oil wells situated in various calcareous formations, showing the hydrogen ion concentration as expressed in pH values. These solutions are, of course, intended as specific embodiments and are not to be construed as limiting the invention:

*Table II*

| Constituent | Parts by weight | pH |
|---|---|---|
| (A) Acetic acid | 20.0 | |
| Sodium acetate | 6.5 | 4.0 |
| Water | 73.5 | |
| (B) Acetic acid | 15.0 | |
| Sodium acetate | 1.0 | 3.0 |
| Water | 84.0 | |
| (C) Chloracetic acid | 15.7 | |
| Potassium chloracetate | 10.0 | 2.5 |
| Water | 74.3 | |
| (D) Formic acid | 15.0 | |
| Sodium formate | 10.0 | 3.3 |
| Water | 75.0 | |

Examination of the foregoing acidic solutions reveals that in general they possess a hydrogen ion concentration significantly lower than the acid solutions employed heretofore. However, at these concentrations the solutions possess a remarkably high dissolving power because this concentration is maintained by reason of the solutions' buffer character.

The use of these solutions is characterized by a much greater penetration of the calcareous formations than any achieved heretofore. Since penetration of the acidizing medium into the pores and fissures of the well is a factor in the promotion of the flow of oil, this enhanced penetration is an important advantage. This desirable feature is due to the fact that the rate of reaction of the aqueous weak acid solutions is slow compared to that of acids such as hydrochloric. Hence, the solution does not become neutralized immediately upon contacting the rock formation, but rather it retains its acidic character so that, even though a significant time interval elapses between its introduction into the well and its penetration into the various small crevices and fissures, it is still reactive when it gains access to said crevices. The "buffer" characteristic of the solution is, of course, a material aid in this connection.

That the reaction rate of the weak acid solutions can be controlled, and hence the penetration regulated at least to some extent is indicated by the tests set forth in the following example:

*Example I*

A core sample of dolomite taken from an oil well in actual operation was pulverized and four samples weighing 3 grams each were taken therefrom. Each of these samples was treated with one of the following solutions at room temperature and the rate of $CO_2$ evolution measured. The solutions and the $CO_2$ evolution at various time intervals were as follows:

| Solution | Evolution of $CO_2$ | Time |
|---|---|---|
| | Cubic centimeters | Minutes |
| 12% HCl | 40 | 3 |
| 20% acetic acid + 4% sodium acetate | 27 | 45 |
| 20% acetic acid + 12% sodium acetate | 2.5 | 20 |
| 10% acetic acid + 15% sodium acetate | 2.3 | 20 |

From the foregoing tabulation, it may be seen that the rate of gas evolution which is indicative of the rate of reaction is very high when a relatively weak solution of hydrochloric acid is employed as compared to the gas evolved in the case of the various buffer solutions containing acetic acid.

My invention offers a medium capable of dissolving the calcareous oil-bearing strata, even though said strata be of the dolomite type. Not only does it increase the field in which acidizing of oil wells may be applied, but in addition it offers a method for acidizing which is efficient and easy to apply. Thus, it is not necessary to remove the acid solution before its potential dissolving power has been spent, because its use does not entail the formation of prohibitive quantities of insoluble solids which may clog the pores and crevices of the oil-bearing rock. Likewise, the acid media contemplated are, in general, materially less corrosive than those used heretofore so that their application does not necessitate frequent replacement of expensive equipment.

It will be apparent to those skilled in the art that variations from the foregoing description may be made without departing from the spirit of the invention. Thus, it is not essential that the salt of the buffer solution be that of the particular acid employed. For example, a salt such as sodium formate may be used satisfactorily with acetic acid. Likewise, the buffer solution need not be formed by the direct addition of the acid and salt to water, but may be made by adding an alkali such as sodium hydroxide or sodium carbonate to a solution of the desired acid. Thus, a buffer solution containing acetic acid and sodium acetate may be made by mixing in proper proportions anhydrous sodium carbonate with a solution of acetic acid, the $CO_2$ formed by the neutralization reaction being allowed to escape. I intend, therefore, to be bound only in accordance with the following claims.

I claim:
1. A treating material for oil wells and the like, in the form of an aqueous acid solution free from strong acids and comprising a weak acid capable of reacting with calcareous rock to yield water-soluble reaction products and a salt capable of yielding an alkaline reaction upon hydrolysis.
2. The material of claim 1, wherein the acid comprises acetic acid.
3. The material of claim 1, wherein the acid comprises formic acid.
4. The material of claim 1, wherein the acid comprises lactic acid.
5. A treating material for oil wells and the like, in the form of an acid solution free from strong acids and comprising an acid having a dissociation constant not greater than $2.5 \times 10^{-1}$ and capable of reacting with calcareous rock to yield only water-soluble reaction products, an alkali metal salt capable of yielding an alkaline reaction upon hydrolysis, and sufficient water to maintain in solution substantially all of said water-soluble reaction products.
6. A method of promoting the flow of liquid from a well, which comprises introducing into said well an aqueous acid solution free from strong acids and containing a weak acid capable of reacting with calcareous rock to yield water-soluble reaction products and a salt capable of yielding an alkaline reaction upon hydrolysis.
7. A method of treating wells, which comprises introducing thereinto an aqueous acid solution free from strong acids and containing a weak acid capable of reacting with calcareous rock to yield water-soluble reaction products, a salt capable of yielding an alkaline reaction upon hydrolysis, and sufficient water to maintain in solution said water-soluble reaction products.
8. A method of treating oil wells, which comprises introducing thereinto an aqueous acid solution free from strong acids and containing an acid having a dissociation constant not greater than $2.5 \times 10^{-1}$ and capable of reacting with calcareous rock to yield only water-soluble reaction products, a salt capable of yielding an alkaline reaction upon hydrolysis, and sufficient water to maintain in solution said water-soluble reaction products.
9. The method of claim 8, wherein the acid present in the aqueous acid solution is acetic acid.
10. The method of claim 8, wherein the acid present in the aqueous acid solution is formic acid.
11. The method of claim 8, wherein the acid present in the aqueous acid solution is lactic acid.
12. A method of treating oil wells to promote the flow thereof, which comprises introducing into the well an acid solution free from strong acids and containing an acid capable of reacting with calcareous rock to yield only water-soluble reaction products and having a dissociation constant not greater than $2.5 \times 10^{-1}$, an alkali metal salt capable of yielding an alkaline reaction upon hydrolysis, and sufficient water to maintain in solution substantially all said water-soluble reaction products.
13. A method of treating oil wells, which comprises introducing thereinto an aqueous acid solution free from strong acids and containing acetic acid, sodium acetate, and sufficient water to maintain in solution the water-soluble reaction products resulting from the action of said solution on the calcareous rock formation.
14. A method of acidizing oil wells, which comprises introducing into the wells an acidic solution free from strong acids and containing 20 parts by weight of acetic acid, 6.5 parts of sodium acetate and 73.5 parts of water.

HARRISON H. HOLMES.